United States Patent [19]
Kolchinsky et al.

[11] Patent Number: 5,271,599
[45] Date of Patent: Dec. 21, 1993

[54] MODULAR SOLENOID VALVE

[76] Inventors: Abel E. Kolchinsky; Gennady Shimelfarb; Felix Aronovich, all c/o Sterling Hydraulics, Inc., 920 E. State Pkwy., Schaumburg, Ill. 60173

[21] Appl. No.: 875,677

[22] Filed: Apr. 29, 1992

Related U.S. Application Data

[62] Division of Ser. No. 590,297, Sep. 28, 1990, abandoned.

[51] Int. Cl.$^5$ ............................................. F16K 31/05
[52] U.S. Cl. ............................ 251/30.04; 251/30.01
[58] Field of Search ............ 251/30.01, 30.04, 129.03, 251/253, 254, 30.02, 129.01

[56] References Cited

U.S. PATENT DOCUMENTS

| Re. 25,338 | 2/1963 | Olson | 251/30.04 |
|---|---|---|---|
| 3,405,906 | 10/1968 | Keller | 251/30.04 |
| 4,304,264 | 12/1981 | McClintock et al. | 251/30.04 X |
| 4,544,128 | 10/1985 | Kolchinsky et al. | 251/30.01 |
| 4,592,533 | 6/1986 | Guglielmi et al. | 251/30.01 |
| 4,699,351 | 10/1987 | Wells | 251/30.01 X |

*Primary Examiner*—Martin P. Schwadron
*Assistant Examiner*—Kevin L. Lee
*Attorney, Agent, or Firm*—Wood, Phillips, VanSanten, Hoffman & Ertel

[57] ABSTRACT

A modular solenoid valve has a housing including a valve seat having a valve chamber connecting an inlet port and an outlet port. A poppet is movable in the chamber between a valve open position and a valve closed position. An elongate movable pilot valve is partially received in a pilot valve chamber in the poppet for controlling the position of the poppet, the pilot valve including first and second axially spaced, radially extending throughbores. A reciprocally movable solenoid plunger is operably associated with the pilot valve for positioning the pilot valve. A pin is inserted through either the first bore to connect the pilot valve to the plunger in a normally closed valve configuration or the second bore to connect the pilot valve to the poppet in a normally open valve configuration. A solenoid coil controls the position of the plunger to move the pilot valve to an actuated position.

11 Claims, 5 Drawing Sheets

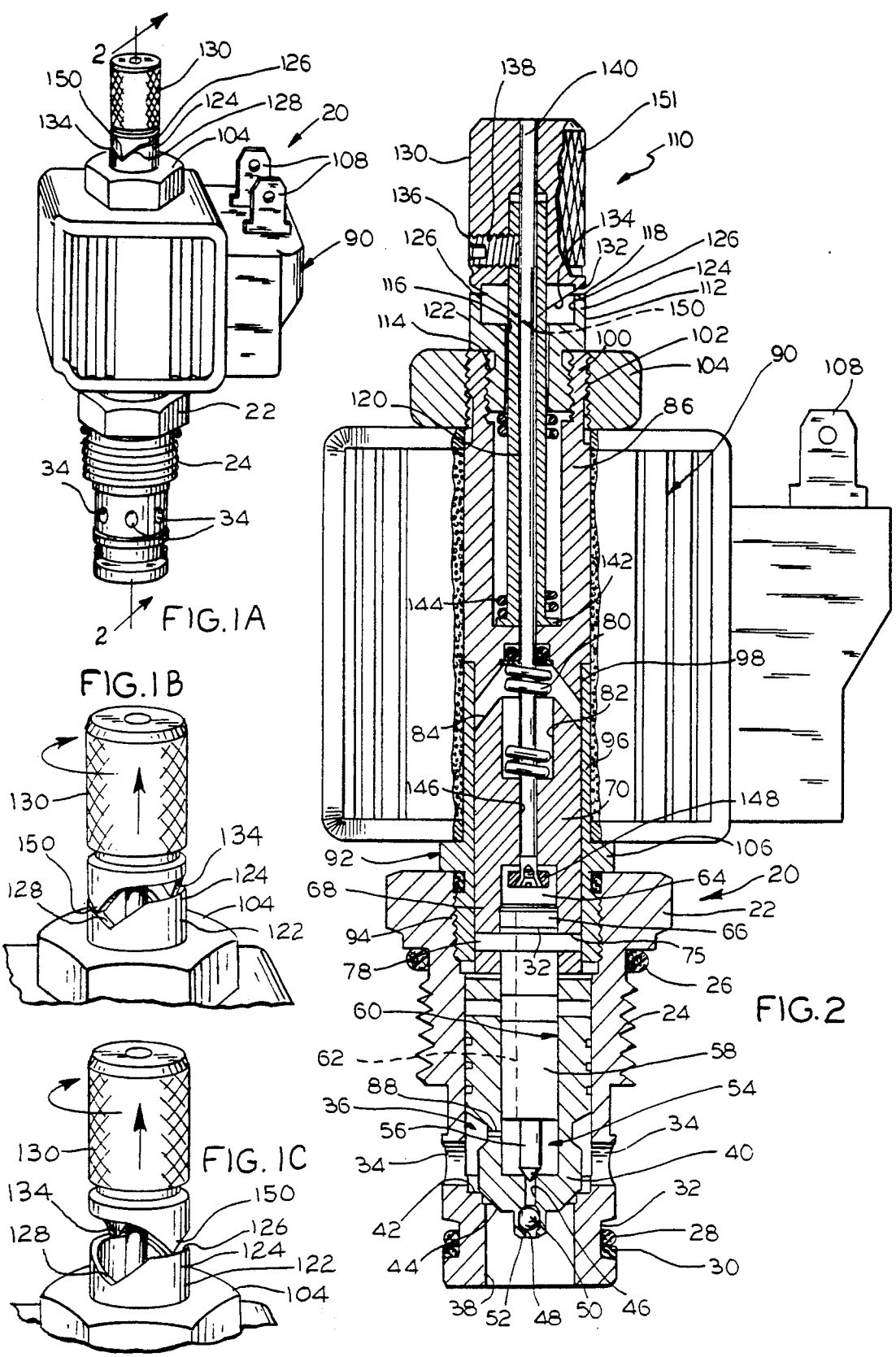

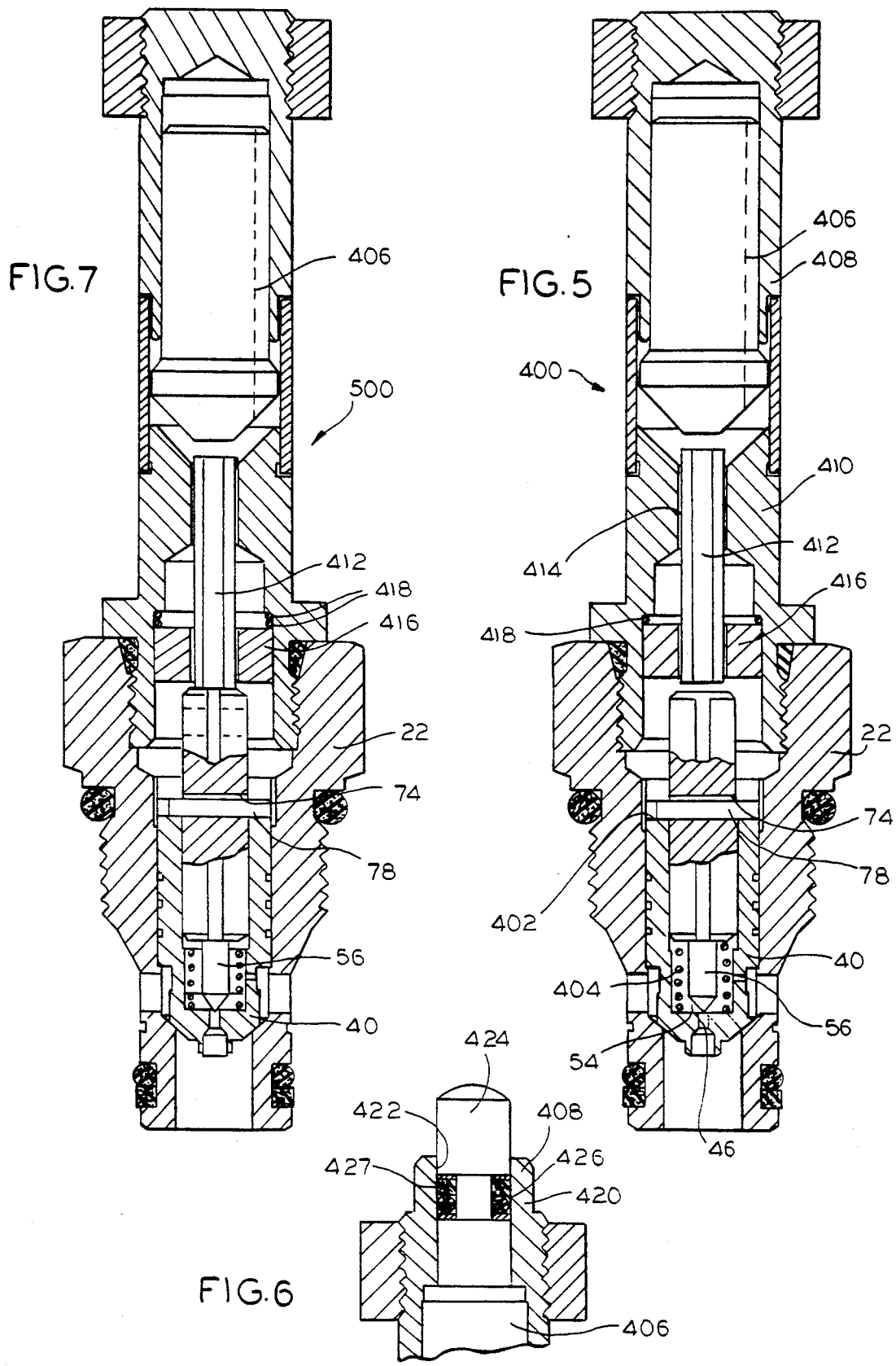

MODULAR SOLENOID VALVE

This is a division of application Ser. No. 590,297 filed Sep. 28, 1990, abandoned.

FIELD OF THE INVENTION

This invention relates to valves, and more particularly, to solenoid operated cartridge valves.

BACKGROUND OF THE INVENTION

In one form of a fluid flow control valve, a poppet is movably positioned in a stationary valve seat to open or close the valve. The poppet is provided with a pilot valve chamber connecting an axial bore which is selectively opened or closed by a pilot valve. A reciprocally movable solenoid plunger is operatively associated with the pilot valve for positioning the pilot valve. The pilot valve is spring biased to either a normal open or closed position. A solenoid coil controllably positions the plunger to move the pilot valve to an actuated position as by overcoming the bias of the spring.

A problem arises in such cartridge valves in that it is desirable at times to operate the valve manually, such as to close or open the valve in the event of failure of the solenoid, or when performing troubleshooting. It is also desirable that with operating the valve manually, the valve be provided with a fool-proof system to enable automatic return to the non-overridden position.

For a valve manufacturer problems arise owing to the various different configurations used in a given line of solenoid cartridge valves. For example, the valves can be normally open or normally closed, fast response or high flow type, as well as high pressure or low pressure. Usually when going from one type valve to another, it is necessary to use different parts in each type owing to the distinct operational requirements of each. Such requirements necessitate the stocking of greater numbers of parts and purchasing in less quantities so that manufacturing and purchasing economies of scale are less than ideal.

The present invention is intended to overcome one or more of the problems as set forth above.

DESCRIPTION OF THE INVENTION

In accordance with the invention there is provided a modular valve assembly provided with a manual override.

Broadly, there is disclosed herein a manual override in a valve having a housing, a flow control element movable in the housing between a valve open position and a valve closed position. A movable pilot valve in the housing controls the position of the flow control element. A reciprocally movable solenoid plunger operatively associated with the pilot valve positions the pilot valve. A spring is operatively positioned in the housing to bias the pilot valve in a normal position. A solenoid coil controllably positions the plunger to move the pilot valve to an actuated position as by overcoming the bias of the spring. The manual override comprises a user engagable actuator element, means mounting the actuator element on the housing for reciprocal movement relative thereto between a neutral position and an override position, means operatively connecting the actuator element to the plunger for effecting reciprocal movement of the plunger responsive to reciprocal movement of the actuator element from the neutral position to the override position to provide manual override of the solenoid coil, and biasing means for urging the actuator element to the neutral position in the absence of user engagement of the actuator element.

It is a feature of the invention that the mounting means comprises cooperating cam surfaces on the housing and the actuator element for converting rotational movement of the actuator movement relative to the housing to reciprocal linear movement.

It is another feature of the invention that the biasing means urges the actuator element cam surface against the housing cam surface to a neutral locked position.

It is a further feature of the invention that the cooperating cam surfaces convert oidirectional rotational movement of the actuator element to reciprocal movement.

It is yet another feature of the invention that the actuator element comprises a momentary push button actuated by a user depressing said push button.

In accordance with another aspect of the invention there is disclosed a manual override in a valve having a housing, and a poppet movable in the housing between a valve open position and a valve closed position. A pilot valve is movable in the housing for controlling the position of the poppet. A reciprocally movable solenoid plunger is operatively associated with the pilot valve for positioning the pilot valve. A spring biases the pilot valve in a normal position. A solenoid coil controllably positions the plunger to move the pilot valve to an actuated position as by overcoming the bias of the spring. The manual override comprises a user engagable control knob outwardly of the housing and including opposite, concave notches at one end to define cam surfaces. The housing includes opposite, convex protrusions at one end to define cam surfaces. A control member extends through an opening in the one end of the housing for connecting the control knob to the plunger with the knob cam surfaces bearing on the housing cam surface for effecting reciprocal movement of the plunger responsive to rotational movement of the control knob from a neutral position to an override position to provide manual override of the solenoid coil. Biasing means are provided for urging the control knob to the neutral position in the absence of user engagement of the actuator element.

It is a feature of the invention that the convex protrusions define an outer flat to provide a detent position for temporarily maintaining the control knob in the override position.

There is disclosed in accordance with yet another aspect of the invention a modular solenoid valve comprising a housing including a valve seat having a valve chamber connecting an inlet port and an outlet port. A poppet is movable in the chamber between a valve open position and a valve closed position An elongate movable pilot valve is partially received in a pilot valve chamber in the poppet for controlling the position of the poppet, the pilot valve including first and second axially spaced, radially extending through bores. A reciprocally movable solenoid plunger is operatively associated with the pilot valve for positioning the pilot valve. A pin is inserted through either the first bore to connect the pilot valve to the plunger in a normally closed valve configuration or the second bore to connect the pilot valve to the poppet in a normally open valve configuration. A solenoid coil controllably positions the plunger to move the pilot valve to an actuated position It is a feature of the invention, wherein the valve is a normally open valve, that the valve further comprises a push rod disposed between the plunger and the pilot valve.

It is another feature of the invention that a spacer is provided in the housing for maintaining the push rod in a select neutral position, an axial dimension of the spacer being selected to provide either a fast response valve or a high flow valve.

It is another feature of the invention that the poppet includes an axial bore in communication with the valve chamber having an outer counterbore receiving a check valve.

It is yet another feature of the invention that the check valve comprises a spherical element in the counterbore and the outer edge of the poppet is crimped to retain the spherical element in the counterbore.

It is still another feature of the invention that the valve seat and poppet are selected to provide for different flow capacity operation.

It is still a further feature of the invention, wherein the valve is a normally closed valve, that the plunger includes first and second axially spaced, radially extending through bores and the pin extends through the pilot valve first bore into either the plunger first or second bore to provide either a fast response valve or a high flow valve.

There is disclosed in accordance with yet a further aspect of the invention a modular solenoid valve comprising a housing including a valve seat having a valve chamber connecting an inlet port and an outlet port. A poppet is movable in the chamber between a valve open position and valve closed position. An elongate movable pilot valve is partially received in a pilot valve chamber in the poppet for controlling the position of the poppet, the pilot valve including a radially extending through bore. A reciprocally movable solenoid plunger is operatively associated with the pilot valve for positioning the pilot valve and includes first and second axially spaced, radially extending through bores. A pin is inserted through either the first or second plunger bore and into the pilot valve bore to connect the pilot valve to the plunger to provide either a fast response valve or a high flow valve. A solenoid coil controllably positions the plunger to move the pilot valve to an actuated position.

Further features and advantages of the invention will readily be apparent from the specification and from the drawings.

BRIEF DESCRIPTION OF THE DRAWINGS

FIG. 1A is a perspective view of a normally closed, high flow cartridge valve, with manual override, embodying the invention;

FIG. 1B is a perspective view of the control knob being moved to the manual override actuated position;

FIG. 1C is a perspective view of the control knob in the manual override actuated position;

FIG. 2 is a sectional view taken along the line 2—2 of FIG. 1a;

FIG. 5 is a view similar to that of FIG. 3 illustrating a normally open, high flow cartridge valve;

FIG. 6 is a detailed view illustrating a modification to the valve of FIG. 5 to provide a manual override;

FIG. 7 is a view similar to that of FIG. 3 illustrating normally open, fast response cartridge valve;

DETAILED DESCRIPTION OF THE INVENTION

Figure 3:
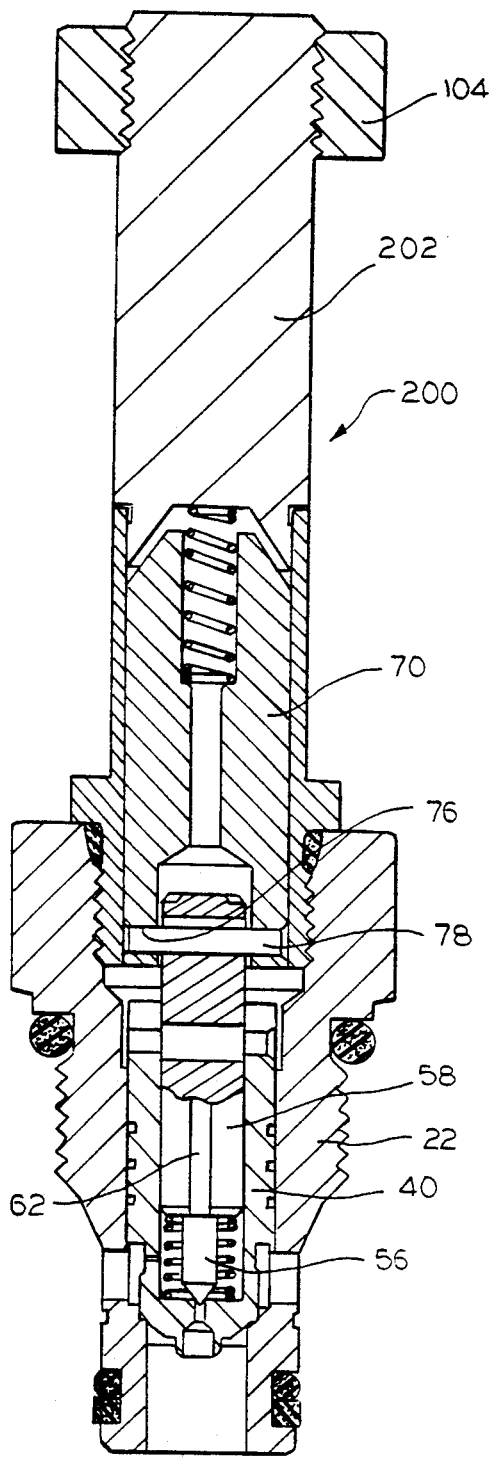
FIG. 3 is a view similar to that of FIG. 2 illustrating a normally closed, fast acting cartridge valve embodying the invention, the solenoid coil being omitted for clarity.

In a first embodiment of the invention, and with reference to FIGS. 1a and 2, a solenoid valve generally designated 20 is shown to comprise a modular solenoid valve having a manual override. The valve 20 includes a stationary valve seat 22 having a threaded outer portion 24 adapted to be threaded a fluid port (not shown). First and second sealing rings 26 and 28 are provided on the valve seat 22 for sealing the valve assembly within the fluid port. A backup ring 30 may be associated with the sealing ring 28 in a suitable outwardly opening, annular recess 32 of the valve seat 22.

The valve seat 22 is provided with a plurality of circumferentially spaced inlet ports or openings 34 which open radially inwardly into a valve chamber comprising an axial cylindrical bore 36 through the valve seat 22. An outlet opening or port 38 opens axially from the valve chamber 36 and is selectively opened or closed by a valve member, or poppet, 40, see FIGS. 9 and 10, seating on an annular seat 42 of the valve seat 22 at the inner end of the outlet port 38

As used herein, the relative term outer or outward refers to a direction axially towards the outlet port 38 i.e., downward in the figures, and the relative term inner or inward refers to a direction axially away from the outlet port 38, i.e., upward in the figures.

When the valve 20 is installed in a suitable fluid port, fluid pressure between the seals 26 and 28 is applied through the inlet ports 34 against the poppet 40. In the illustrated embodiment, the poppet 40 has an outer seating portion 44 engaging the valve seat 42 and provided with an axial bore 46 having an outer counterbore 48 receiving a check valve 50. Particularly, the check valve 50 comprises a spherical element disposed in the counterbore 48 with an outer edge of the poppet 40 being crimped as at 52 to retain the spherical element 50 therein. The check valve 50 prevents fluid pressure in the outlet port 38 from causing a reverse flow through the bore 46 into a pilot valve chamber 54 within the poppet 40.

Figures 12, 13:
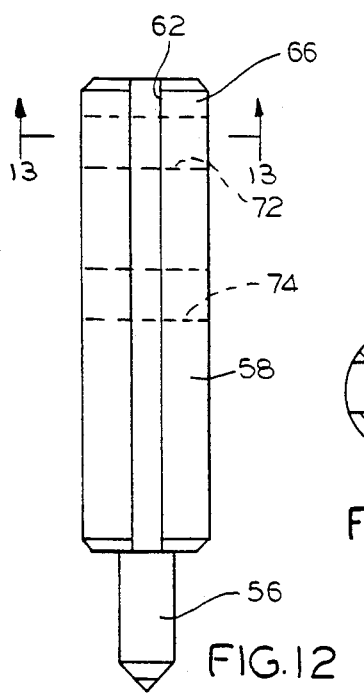
FIG. 12 is a plan view of a pilot valve used in each of the above cartridge valves.
FIG. 13 is a sectional view taken along the line 13—13 of FIG. 12.

The bore 46 is normally closed by a pilot valve 56, see FIGS. 12 and 13, having a slide portion 58 slidably received in an upper cylindrical recess 60 of the poppet 40. The slide portion 60 is provided with a radially outer, longitudinally extending groove 62 for providing fluid communication between a transfer chamber 64 and the pilot valve chamber 54.

The pilot valve slide portion 58 acts as a pilot guide and defines an upper end 66 received in a counterbore at an outer end 68 of a solenoid plunger 70 in the normally closed arrangement of the valve 20. Particularly, and with reference also to FIGS. 12 and 13, the slide portion 58 includes first and second axially spaced, radially extending through bores 72 and 74, respectively. The plunger 68 includes first, second and third axially and circumferentially spaced, radially extending through bores 75-77, respectively A rolled pin 78 extends through the pilot valve first bore 72 and into the plunger first bore 75. As illustrated, the pin 78 has a outer diameter somewhat less than an inner diameter of the pilot valve first bore 72 to provide for limited relative movement between the plunger 70 and the pilot valve 56.

In the normally closed arrangement of the solenoid valve 20, the plunger 70 is biased outwardly by a helical coil spring 80 acting between an inner counterbore 82 of the plunger inner end 84 and a plug 86. The spring 80 has sufficient strength to urge both the pilot valve 56 and the poppet valve 40 outwardly into the seated arrangement of FIG. 2.

As further illustrated in FIG. 2, the poppet 40 is provided with a bleed passage 88 providing communication between the inlet 34 and the pilot valve chamber 54 at all times. Thus, in the normally closed position wherein the pilot valve 56 is closing the pilot opening 46, fluid pressure at the inlet openings 34 is transmitted through the bleed passage 88 into the pilot valve chamber 54 and acts to maintain the poppet valve 40 in the closed position illustrated in FIG. 2, in cooperation with the spring 80.

The pilot valve 56 is reciprocally moved from the seated position illustrated in FIG. 2 by suitable reciprocal, longitudinal movement of the plunger 70 inwardly toward the plug 86 under the control of a solenoid coil 90 of conventional construction. The plunger 70 is reciprocally movable in a housing 92 comprising the valve seat 22 threadably connected as at 94 to a tubular sleeve 96 receiving the plunger 70. The sleeve 96 is secured as by brazing or welding at 98 to the plug 86. An outer end 100 of the plug 86 includes a threaded portion 102. A nut 104 is threaded to the threaded portion 102 to clamp the solenoid coil 90 between the nut 104 and a flange 106 integral with the sleeve 96.

The plunger 70 is reciprocally slidable in the sleeve 96 between the normally closed position of the valve illustrated in FIG. 2, and an open position of the valve wherein the plunger 70 is raised into abutment with the plug 86.

Energization of the coil 90 as by applying electrical power across terminals 108 creates a magnetic field in space occupied by the plunger 70 to cause the same to move inwardly against the force of the spring 80 until it abuts the plug 86. Inward movement of the plunger 70 which is operatively associated with the pilot valve 56 via the pin 78 causes inward movement of the pilot valve 56 so as to unseat the pilot valve 56 from the poppet axial bore 46. Thereafter, pressure at the inlet 34 is greater than pressure at the pilot hole 46 and the lifting force moves the poppet 40 forward inwardly to provide fluid flow between the inlet openings 34 and the outlet opening 38.

Under suitable circumstances, such as during emergency conditions or while troubleshooting, it is desirable to manually override the operation of the coil 90 to actuate the valve 20, i.e, move the poppet 40 to the actuated or open position. At the same time, it is desirable that any such manual override be fool-proof to prevent inadvertent maintenance of the solenoid valve 20 in the manually overridden position.

In accordance with the invention, the solenoid valve 20 includes a manual override 110. The manual override 110 comprises a collar 112 threadably connected to a threaded counterbore 114 at the plug inner end 100. The collar 112 includes an axial bore 116 and an inner counterbore 118 receiving a control rod sleeve 120. The collar 112 includes a cylindrical outer wall 122 having a pair of opposite, convex protrusions 124 each including a flatted end portion 126 to define cam surfaces 128.

A control knob 130 has an outer diameter similar to that of the collar wall 122. The control knob 130 is coaxial with and positioned axially inwardly of the collar 112 and includes opposite, concave notches 132 defining cam surfaces 134. A screw 136 extends through a radial bore 138 in the control knob 130 to secure the control knob to an elongate rod 140 and the coaxial tubular sleeve 120 received thereon. The outer end of the tubular sleeve 120 includes a flange 142 with a coil spring 144 biasing the flange 142, and thus the control knob 130 outwardly. Such biasing maintains the control knob cam surfaces 134 in engagement with the collar cam surfaces 128. The control rod 140 extends through the sleeve 120 and a plunger axial bore 146 with an annular stop member 148 secured to an outer end of the rod 140 in the chamber 64. The control rod 140 connects the control knob 130 to the plunger 70 as by converting reciprocal movement of the control knob 130 to reciprocal movement of the plunger 70, but not vice-versa.

As is apparent, rotational movement of the control knob 130 by a user grasping a knurled outer portion 150 acts through the cooperating cam surfaces 128 and 134 to cause the control knob 130 to move linearly inwardly, i.e. upwardly as viewed in FIG. 2, owing to the inclined cam surfaces 128 and 134. Inward directed movement of the control knob 130, against the force of the spring 144, causes the stop 148 to engage the plunger counterbore 82 to reciprocally move the plunger 70 inwardly. Inward movement of the plunger 70 causes the pilot valve 56 to be moved away from the pilot hole 46 to subsequently move the poppet 40 from the normally closed position to the open position, as discussed above. Immediately upon releasing the control knob 130, the force of the coil spring 144 causes the control knob 130 to return to the normal, or neutral, position with the housing convex protrusions 124 received in the concave notches 132 of the control knob 130. Thus, the control knob 130 is effectively locked or maintained in the neutral position as by operation of the coil spring 144. If it is desirable to temporarily maintain the manual override 120 in the overridden position, then the control knob 130 can be turned a greater distance so that an intersection point 150 between the two notches 132 rests on the flatted, detent portion 126 of the collar 112. Thereafter, slight rotational movement of the control knob 130 causes the control knob 130 to automatically return to the neutral position.

Owing to the use of dual protrusions 124 and dual notches 132, rotation of the control knob 130 in either rotational direction cause reciprocal movement of the control knob 130.

As is apparent, when the manual override 110 is in the neutral position, the solenoid valve 20 is actuated only by energization of the solenoid coil 90.

It is desirable that a line of cartridge valves use as many common parts as possible. In accordance with the invention the valve seat 22, poppet 40 and pilot valve 56 are used throughout a wide range of applications, as well as the plunger 70, albeit to a lesser extent.

Figure 8:
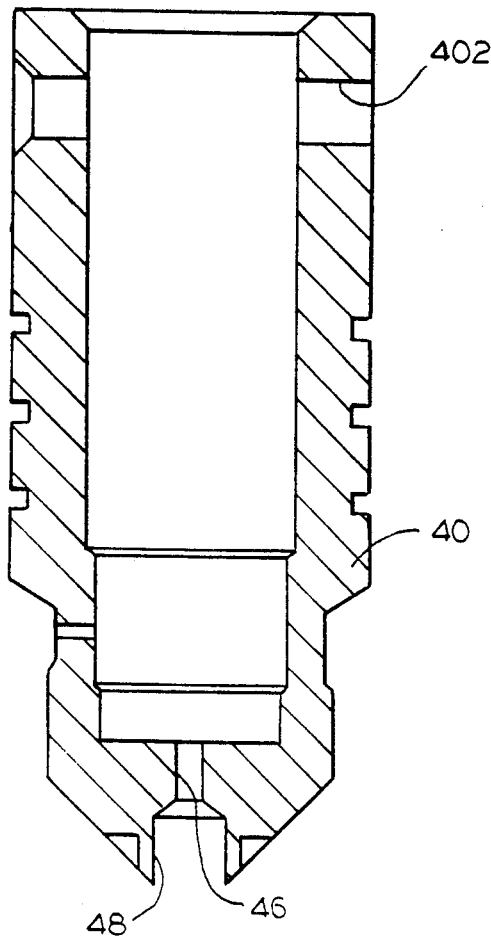
FIG. 8 is a sectional view of a first flow capacity poppet for restricted reverse flow applications.

The solenoid valve 20 of FIG. 2, in addition to being normally closed configuration, is provided for high flow operation with free reverse flow owing to use of the check valve 50. To provide restricted reverse flow the spherical element 50, and crimped end 52 of the poppet 40 can be eliminated as shown in FIG. 8.

With reference to FIG. 3, a cartridge valve 200 provided with fast response and restricted reverse flow is illustrated. Otherwise, the cartridge valve 200 is generally similar to the cartridge valve 20 shown in FIG. 2, except that the manual override is eliminated and instead, a solid plug 202 is utilized. For simplicity, the valve 200 is illustrated with like reference numerals relating to use of like components for those discussed above relative to FIG. 2.

Figures 14, 15:
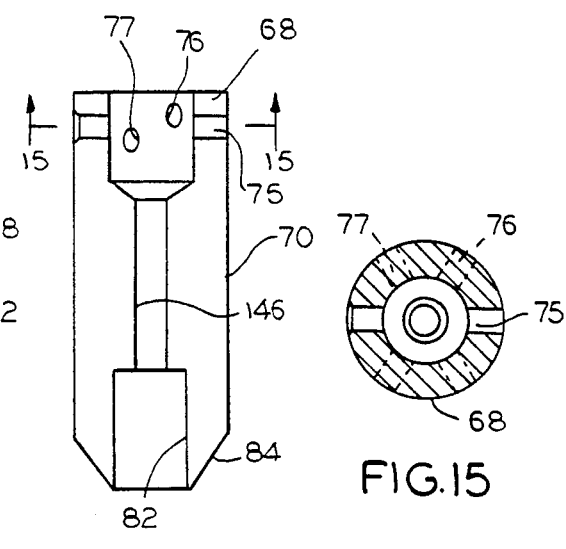
FIG. 14 is a plan view of a plunger used in each normally closed cartridge valves discussed above.
FIG. 15 is a sectional view taken along the line 15—15 of FIG. 14.

Since no check valve is provided, the poppet 40 provides for restricted reverse flow. In order to provide fast response, the rolled pin 78 which extends through the pilot first bore 72 extends through the plunger second bore 76, rather than first bore 75 as in FIG. 2. Consequently, the plunger 70 in the neutral position is displaced a greater distance inwardly, the distance corresponding to the axial spacing between the bores 75 and 76 of the plunger, see FIG. 14. As a result, the valve is faster acting. However, since the plunger 70 abuts the plug 202 sooner, the valve provides for less flow than with the valve 20 of FIG. 2.

Thus, by utilizing a plunger 70 including a plurality of bores, different configurations of valve structure can be provided utilizing the same parts. Indeed, the third axial bore 77 in the plunger could be used to provide even higher flow than with that illustrated in FIG. 2.

Figure 4:
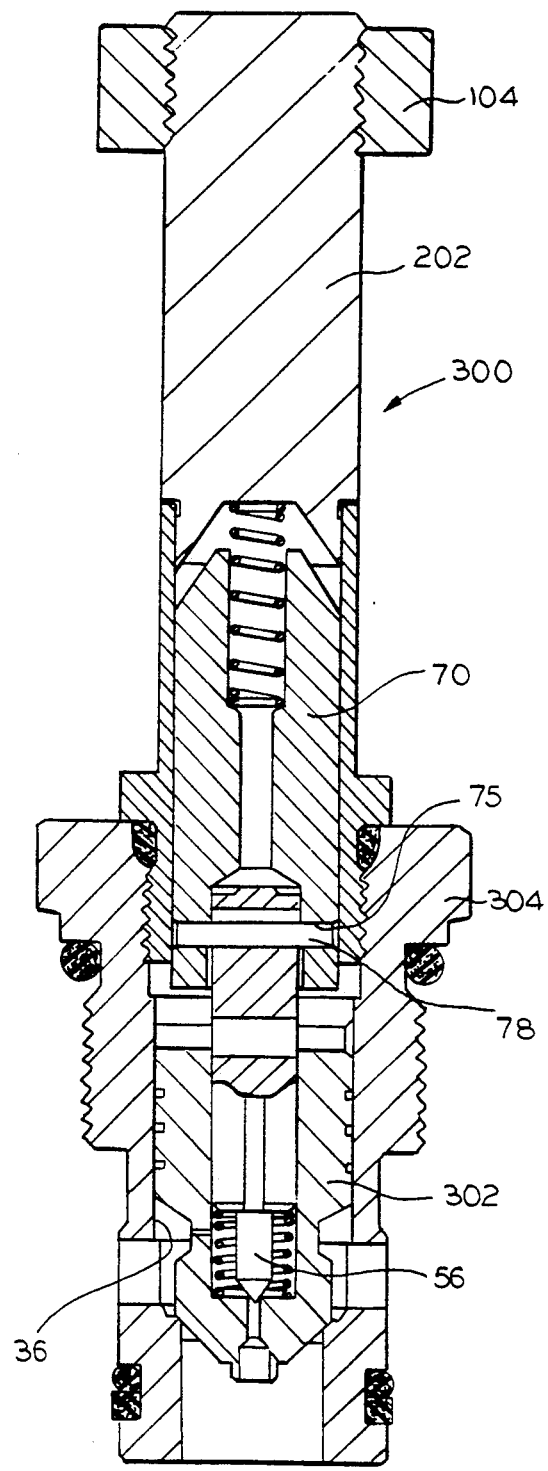
FIG. 4 is a view similar to that of FIG. 3 illustrating a normally closed, larger flow capacity, high flow cartridge valve.

With reference to FIG. 4, a cartridge valve 300 is illustrated which is generally similar to that of FIG. 3, except being configured for high flow operation and larger flow capacity operation. Particularly, the pin 78 extends through the plunger first bore 75, as with the embodiment of FIG. 2. However, the poppet 40 is replaced with a poppet 302, see FIG. 11, which is generally similar to the poppet 40 of FIG. 8, except for having a wall of a greater thickness. As is apparent, a valve seat 304 is provided with a larger valve chamber 36 to accommodate the larger flow capacity. In all other respects, the valve 300 is similar to that discussed above.

With reference to FIG. 5, a normally open solenoid cartridge valve 400 is illustrated. Owing to the modularity of assembly discussed above, the cartridge valve 400 uses the same valve seat 22, poppet 40 and pilot valve 56 as with the normally closed cartridge valve 200 of FIG. 3. The pin 78, instead of connecting the pilot valve 56 to the plunger 70, extends through the pilot valve second bore 74, see also FIG. 12, and into a radially extending through opening 402 provided in the poppet 40, see FIG. 8. The axial spacing between the poppet radial bore 402 and axial bore 46 is selected so that owing to cam action of a coil spring 404 in the valve chamber 54, the poppet valve 56 is normally unseated from the pilot hole 46 by a very short distance. Movement of the pilot valve 56 is limited by the amount that the pin outer diameter is less than the bore 74 inner diameter, see FIG. 5. Such limited spacing is sufficient to close off the axial bore 46.

In order to move the pilot valve 56 from the normally open position to an actuated, closed position, a plunger 406 is slidably received in a tubular sleeve 408 brazed to a stop member 410. A push rod 412 extends through a bore 414 in the stop member 410 and is secured to an annular ring 416. A spacer 418 normally maintains the ring 416 in a select neutral position. Energization of a solenoid coil (not shown), creates a magnetic field which moves the plunger 406 outwardly, i.e. downwardly in the illustration, so that it acts on the push rod 412 to in turn push outwardly on the pilot valve 56 against the spring 404 to close off the pilot hole 46 and thus close the valve 400.

With reference to FIG. 6, a modified form of the valve 400 of FIG. 5 is illustrated wherein an inner end 420 of the cap 408 includes an axial bore 422 slidably receiving a push button 424. The push button 424 is sealed by an 0-ring 426 and backup ring 427. The push button 424 acts as a manual override as by depression of the button 424 Which moves the plunger 406 outwardly to manually actuate the valve 400 to the closed position. As is apparent, releasing the button 424 results in the coil spring 404 automatically returning the button 424, via the push rod 412 and plunger 406, to the neutral position. Thus, a fool-proof manual override is provided which only maintains the valve in the actuated position while a user is depressing on the button 424.

With reference to FIG. 7, a normally open cartridge valve 500 is illustrated. The cartridge valve 500 is generally similar to the valve 400 of FIG. 5, except that two spacers 418 are used to space the ring 416 more closely to the pilot valve 56. Thus, less movement of the push rod 412 is required in order to actuate the valve to provide a fast response valve.

Figure 11:
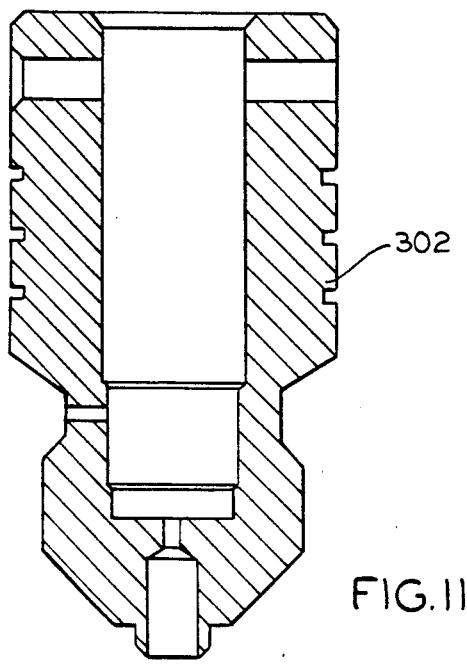
FIG. 11 is a sectional view, similar to that of FIG. 8, for a larger flow capacity poppet.

Although not shown, a normally open valve could be provided for larger flow capacity operation merely by replacing the poppet 40 with the poppet 302, see FIG. 11, and replacing the valve seat 22 with the valve seat 304 illustrated in FIG. 4.

Figure 9:
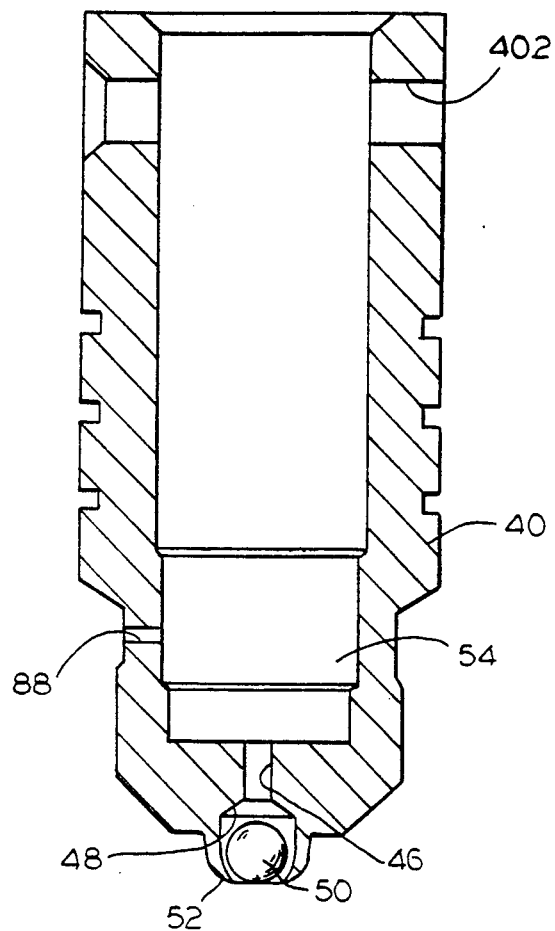
FIG. 9 is a sectional view, similar to that of FIG. 8, showing a poppet including a check valve for free reverse flow applications.
Figure 10:
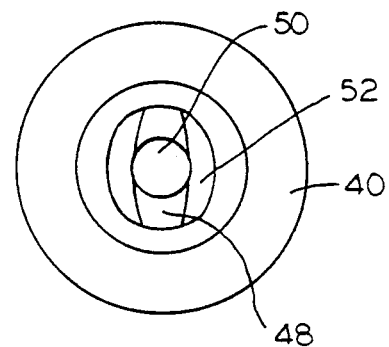
FIG. 10 is an end view of the poppet of FIG. 9.

Thus, in accordance with the invention, a modular family of valve assemblies is provided in which a common valve seat 22, poppet valve 40 and pilot valve 46 are used for all configurations of normally open, normally closed, high flow and fast response type valves merely by altering the placement of the connecting pin 78. Further, the valve can be converted from restricted reverse flow to free reverse flow merely by inserting the spherical element 50 in the poppet counterbore 48 and crimping the same, as illustrated in FIGS. 9 and 10. For larger flow capacity applications, any of the above valves may continue to use the same pilot valve while the poppet valve and valve seat are modified, as discussed above.

Further, a manual override can be provided on either a normally open or normally closed type cartridge valve by replacing the plug or cap structure with the manual override assembly shown herein. Indeed, such a manual override is provided with auto return to avoid possibility of the manual override inadvertently being left in the overridden position. Further, with the normally closed type valve, the use of the described cam structure allows the user to turn the knob, rather than pulling the same, which is believed to believed to be an easier action to undertake.

The illustrated embodiment of the invention is intended to not be limiting, but rather only illustrate the broad inventive concepts comprehended by the inventors.

We claim:

1. A modular solenoid valve comprising;
   a housing including a valve seat having a generally cylindrical valve chamber connecting an inlet port and an outlet port;
   a poppet axially movable in said valve chamber between a valve open position and a valve closed position;
   an elongate movable pilot valve partially received in a pilot chamber in said poppet for controlling the position of said poppet, said pilot valve including first and second axially spaced, radially extending through bores;
   a reciprocally movable solenoid plunger in said valve chamber;
   a solenoid coil for controllably positioning the plunger in said valve chamber;
   means for operatively associating said plunger with said pilot valve in either a normally open valve configuration or a normally closed valve configuration so that movement of said plunger in a direction toward said pilot valve results in said poppet being moved to the closed position and movement of said plunger in a direction away from said pilot valve results in said poppet being moved to the open position; and
   a pin inserted through either said first bore to connect said pilot valve to said plunger in the normally closed valve configuration or said second bore to connect said pilot valve to said poppet in the normally open valve configuration.

2. The modular solenoid valve of claim 1 wherein said associating means provide a select normally open configuration comprising a push rod disposed between said plunger and said pilot valve.

3. The modular solenoid valve of claim 2 further comprising a spacer in said housing for maintaining said push rod in a select neutral position, an axial dimension of said spacer being selected to provide either a fast response valve or a high flow valve.

4. The modular solenoid valve of claim 1 wherein said poppet includes an axial bore in communication with said valve chamber having an outer counterbore receiving a check valve.

5. The modular solenoid valve of claim 4 wherein said check valve comprises a spherical element in said counterbore and the outer edge of said poppet is crimped to retain said spherical element in said counterbore.

6. The modular solenoid valve of claim 1 wherein said valve seat and poppet comprise one of two select configurations to provide for different flow capacity or operation.

7. The modular solenoid valve of claim 1 wherein said associating means provides a normally closed valve configuration and wherein said plunger includes first and second axially spaced, radially extending through bores and said pin extends through said pilot valve first bore into either said plunger first or second bore to provide either a fast response valve or a high flow valve.

8. A modular solenoid valve comprising:
   a housing including a valve seat having a generally cylindrical valve chamber connecting an inlet port and an outlet port;
   a poppet axially movable in said chamber between a valve open position and a valve closed position:
   an elongate movable pilot valve partially received in a pilot chamber in said poppet for controlling the position of said poppet, said pilot valve including a radially extending through bore;
   a reciprocally movable solenoid plunger operatively associated with the pilot valve for positioning the pilot valve and including first and second axially spaced, radially extending through bores;
   a pin inserted through either said first or second plunger bore and into said pilot valve bore to connect said pilot valve to said plunger to provide either a fast response valve or a high flow valve; and
   a solenoid coil for controllably positioning the plunger to move said pilot valve to an actuated position.

9. The modular solenoid valve of claim 8 wherein said poppet includes an axial bore in communication with said valve chamber having an outer counterbore receiving a check valve.

10. The modular solenoid valve of claim 9 wherein said check valve comprises a spherical element in said counterbore and the outer edge of said poppet is crimped to retain said spherical element in said counterbore.

11. The modular solenoid valve of claim 8 wherein said valve seat and poppet comprise one of two select configurations to provide for different flow capacity or operation.

* * * * *